L. R. FELGER.
COOKING UTENSIL.
APPLICATION FILED AUG. 31, 1910.
982,044.
Patented Jan. 17, 1911.
2 SHEETS—SHEET 1.
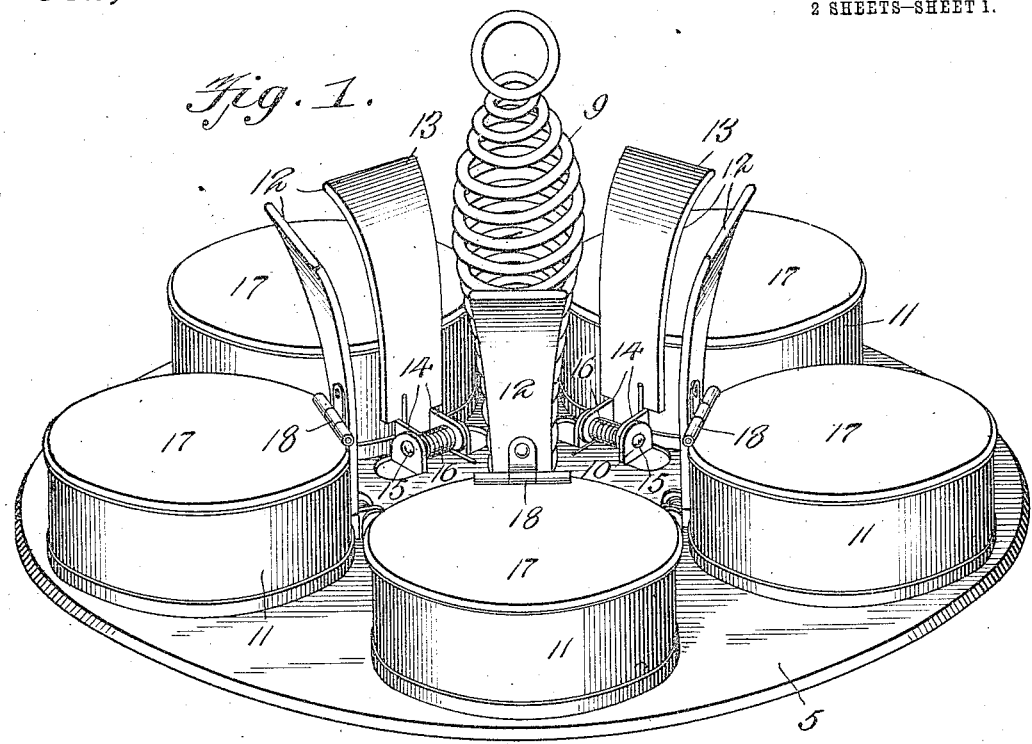
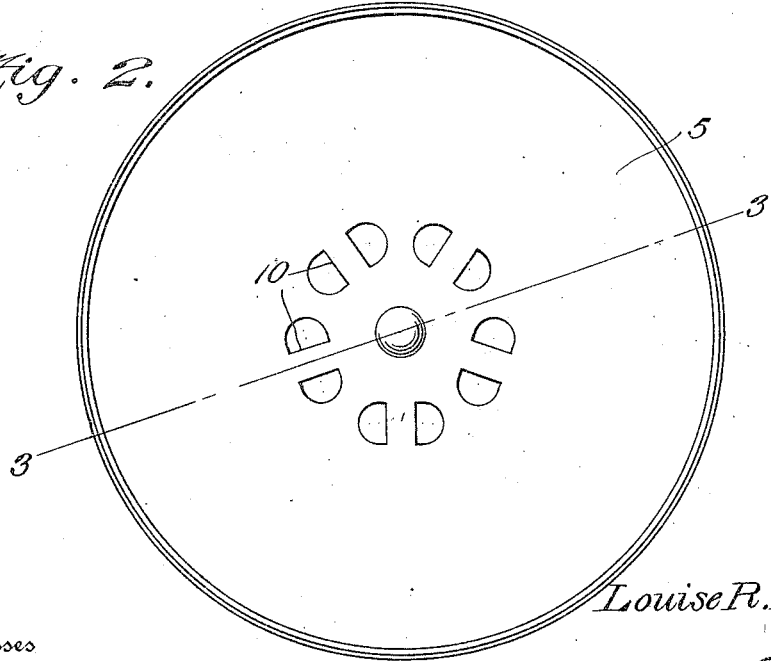
Witnesses
Frank B. Hofman
H. O. Tanken
Inventor
Louise R. Felger
By Victor J. Evans
Attorney L. R. FELGER.
COOKING UTENSIL.
APPLICATION FILED AUG. 31, 1910.
982,044.
Patented Jan. 17, 1911.
2 SHEETS—SHEET 2.
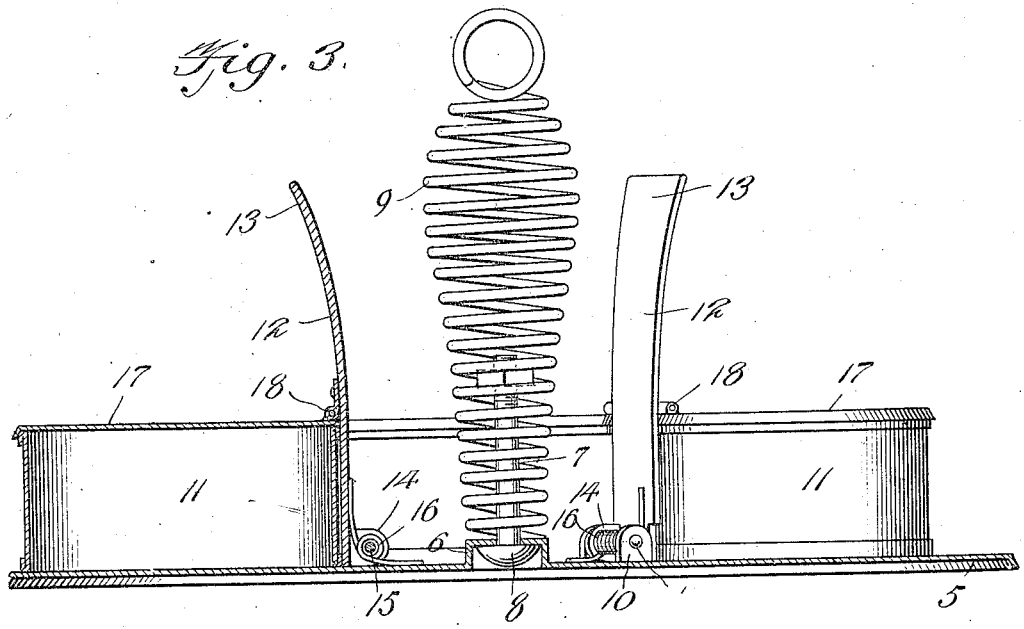
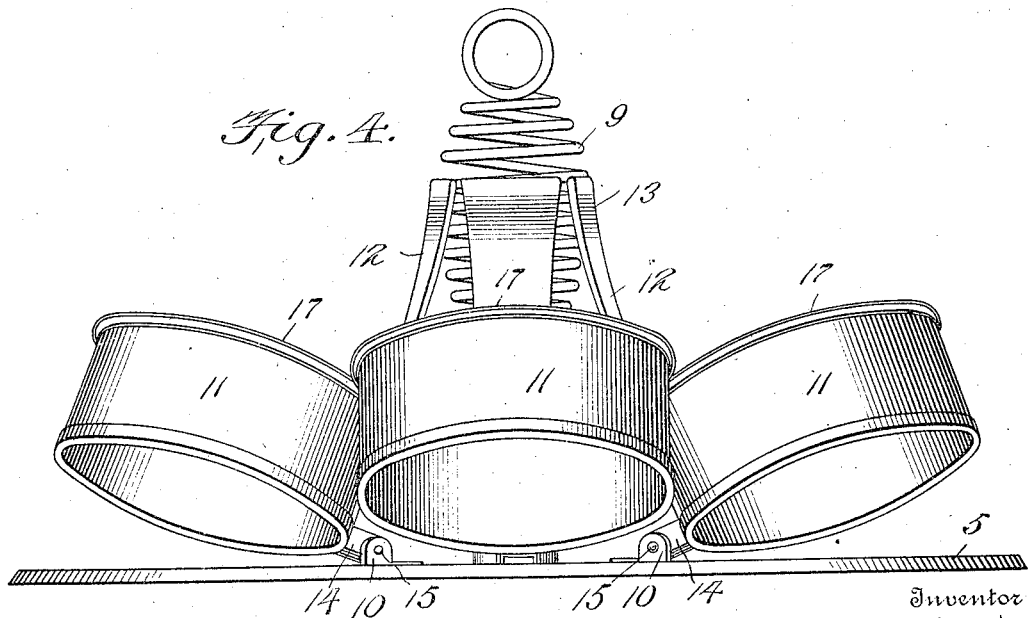
Inventor
Louise R. Felger
Witnesses
Frank B. Hoffman
By Victor J. Evans
Attorney

UNITED STATES PATENT OFFICE.

LOUISE R. FELGER, OF YOUNGSTOWN, OHIO.

COOKING UTENSIL.

982,044.  Specification of Letters Patent.  Patented Jan. 17, 1911.

Application filed August 31, 1910. Serial No. 579,317.

*To all whom it may concern:*

Be it known that I, LOUISE R. FELGER, a citizen of the United States, residing at Youngstown, in the county of Mahoning and State of Ohio, have invented new and useful Improvements in Cooking Utensils, of which the following is a specification.

This invention relates to cooking utensils and more particularly to the class of egg frying pans.

The primary object of the invention is the provision of a utensil of this character in which eggs may be held for the frying thereof so that they will not run together and also which may be readily and quickly removed from the pan without breaking the same after having been cooked.

Another object of the invention is the provision of a cooking utensil in which eggs to be fried or otherwise cooked will be held in cups or pockets that can be raised so that the eggs can be individually removed from the utensil after the same have been fried or cooked without any possibility of their sticking to said utensil or running in contact with other eggs held in the latter.

A further object of the invention is the provision of a utensil in which the cups or pockets for receiving the eggs are closed by means of hinged lids or covers so that during the cooking process of the eggs, the same or grease used therewith will not splatter and the cups or pockets retaining the eggs will separate them thus preventing the running together thereof.

With these and other objects in view the invention consists in the construction, combination and arrangement of parts as will be hereinafter more fully described and pointed out in the claims hereunto appended.

In the drawing: Figure 1 is a perspective view of a cooking utensil constructed in accordance with the invention. Fig. 2 is a bottom plan view thereof. Fig. 3 is a sectional view on the line 3—3 of Fig. 2. Fig. 4 is a side elevation with the cups in raised position.

Similar reference characters indicate corresponding parts throughout the several views in the drawings.

Referring to the drawings by numerals 5 designates a disk or circular-shaped frying platter preferably constructed from cast iron or sheet metal, although it may be made from aluminum or other suitable material, so that when once heated it will retain its heat for a long time. The central portion of the disk is provided with a raised boss 6 containing a suitable aperture through which is passed a bolt member 7 the latter provided with the usual head 8 fitted within a counter seat formed in the said boss 6 and engaged with the said bolt member 7 is a handle 9, the latter rising from the top of the said platter or disk whereby it may be carried from one point to another when desired.

Struck up from the body of the platter or disk 5 concentrically with respect to the boss are spaced bearing ears 10 between which are pivotally connected egg receiving cups or pockets each comprising a ring 11 the wall of which may be of any desirable depth, the ring being suitably secured to the lower end of a handle 12, the upper end of which projects a considerable distance above the ring and is provided with an outwardly curved extremity 13 whereby the handle 12 may be readily gripped and moved to raise the ring 11 for a purpose as will be hereinafter more fully described. These handles 12 at their lower ends are formed with ears 14, which latter are arranged between pairs of the spaced ears 10 and through which latter and the ears 14 are passed pivots 15 whereby the rings 11 may be raised from the platter or disk 5 on the swinging of the handles 12 in one direction. Surrounding the pivots 15 are coil springs 16 each having one end bearing against the platter or disk 5 while its opposite end is suitably fixed to the adjacent handle 12 and these springs serve by reason of their tension to normally hold the rings 11 in contact with the upper face of the platter or disk for receiving eggs placed within the rings whereby the said eggs may be fried upon the platter or disk 5 without any possibility of the same running together.

Connected to the handles 12 above the rings 11 are closure lids or covers 17 by means of hinges 18, the said covers or lids being normally engaged with the upper edges of the rings for closing the tops thereof, thus preventing the splattering of grease or the eggs confined within the cups or pockets formed by the said rings.

In the operation when it is desired to fry eggs the same are placed within the rings 11 on the raising of the lids 17 whereby the said eggs will nest upon the platter 5 whereupon the lids are brought to closed position and the platter is placed upon a stove. After the eggs have been fried upon the platter the handles 12 are successively moved in one direction thereby lifting the rings 11 in raised position with respect to the platter so that upon tilting of the latter the said eggs thus fried may be dropped onto a plate or other receptacle.

From the foregoing description taken in connection with the accompanying drawing it is thought that the construction and operation of the invention will be clear and therefore a more extended explanation has been omitted.

What is claimed, is:—

1. In a cooking utensil of the class described, a disk-like platter, a handle rising centrally from said platter, bearing ears struck up from said platter concentrically with respect to said handle, arms pivotally connected at their lower ends with said ears, rings fixed to the said arms and normally resting upon the upper face of the platter, and lids hinged to said arms and normally closing the said rings.

2. In a cooking utensil of the class described, a disk-like platter, a handle rising centrally from said platter, bearing ears struck up from said platter concentrically with respect to said handle, arms pivotally connected at their lower ends with said ears, rings fixed to the said arms and normally resting upon the upper face of the platter, lids hinged to said arms and normally closing the said rings, and spring means acting upon the arms to sustain the said rings in normal contact with the platter.

In testimony whereof I affix my signature in presence of two witnesses.

LOUISE R. FELGER.

Witnesses:
J. R. JOHNSTON,
FLORENCE M. WARNE.